Nov. 28, 1961     H. E. SPOONER     3,011,044

WELDING APPARATUS AND METHOD

Filed May 5, 1959

INVENTOR.
HOWARD E. SPOONER

BY Karl Huber
James E. Bryan
Alan C. Rose
    ATTORNEYS

United States Patent Office 3,011,044
Patented Nov. 28, 1961

3,011,044
WELDING APPARATUS AND METHOD
Howard E. Spooner, Lincoln, R.I., assignor, by mesne assignments, to Engelhard Industries, Inc., Newark, N.J., a corporation of Delaware
Filed May 5, 1959, Ser. No. 811,138
9 Claims. (Cl. 219—82)

This invention relates to a welding apparatus and more particularly is concerned with a welding apparatus for producing welded circular seams in one operation.

There are a great number of products in which the step of welding circular seams must be performed. One important example is the welding of small diaphragms into their support for use in pressure measuring devices. Another example involves the assembly of radially arranged contact blades with an annular frame for maintaining a large number of blades radially arranged but spaced from each other. In accordance with the previous method for performing this last mentioned job, costly jigs were used to maintain the assembly in the desired arrangement until the individual spot welding steps were completed. Evidently, this method was time-consuming and expensive, since skilled workmanship is required. This is particularly true when producing small assemblies, as the jigs take up part of the space necessary for the welding operation.

It is, therefore, the principal object of this invention to provide an apparatus and a method for producing a welded circular seam in one operation which is especially suitable for use with small workpieces.

Where it is intended to produce radially arranged contact blades, it is preferable to weld a circular or annular disc to a surrounding support and subsequently divide the disc into separate radial tongues by a punching step producing radial incisions by means of an appropriate punching tool. Contact points of a desired material and located at the inner end point of the tongues may be obtained by previously providing an annular application of such a material on the disc. The contact material is then cut into the desired shape together with the disc by the punching operation.

In accordance with the invention, a welded, circular seam is obtained by means of a pair of ring-shaped electrodes having substantially identical diameter and facing each other. The workpiece, for example a metal diaphragm assembled with its frame-shaped support or the prepared contact assembly mentioned above, is brought into contact with one of these electrodes. The other electrode, facing the workpiece from the opposite side thereof, is then brought into contact with the workpiece in such a manner that only one side of the electrode ring is biased toward the workpiece and toward the second electrode. The biasing force is shifted around the electrode so that the two opposed electrodes make rolling contact and form a circular welded seam. This is preferably accomplished by universally mounting one electrode to permit rotation and pivoting or tilting thereof in any direction by biasing, at a fixed location, the periphery of this ring electrode toward the second electrode and rotating the entire system. By suitably driving the second electrode to rotate about its axis, the workpiece and the first-mentioned pivotally mounted electrode are entrained into this rotary movement, whereby a single fixed point of contact between the workpiece and the first named electrode is maintained at the location of biasing.

In accordance with a feature of the invention, two annular electrodes are mounted with circular contact surfaces in spaced opposed relationship, one of the electrodes is mounted for universal movement with respect to the other, and mechanical arrangements are provided for biasing one side only of said electrodes toward engagement and for shifting the biasing force around the periphery of the electrodes.

The invention will be further illustrated by reference to the accompanying drawing in which.

Figure 1:
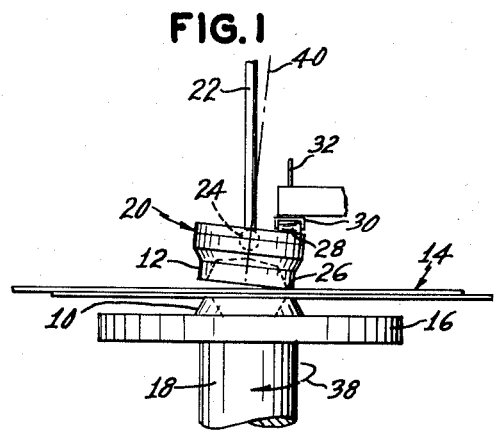
FIGURE 1 is a schematic side view of a welding apparatus during operation, illustrating the principle of the invention.

With reference to FIGURE 1, an illustrative welding apparatus according to the invention uses a pair of ring-shaped electrodes having identical diameter and mounted coaxially to face each other. The electrodes shown in FIGURE 1 each comprise an annular ridge 10 and 12, respectively, having welding surfaces facing each other. Both ridges have the same diameter, which is the diameter of the circular weld to be obtained on a workpiece 14. In order to enable the electrodes to perform as mentioned above, each of the two electrodes is mounted to rotate about it axis. The ridge 10 of the lower electrode forms part of a circular plate 16 secured to a shaft 18 to provide rotation thereof about its axis by any suitable driving means.

As shown in FIGURE 1, the upper electrode is universally mounted to permit its rotation and simultaneously its pivoting or tilting in any direction. This is accomplished by means of a ball joint arranged in the center of the electrode 20. This upper electrode 20 suitably has the shape of an inverted cup having the ridge 12 as the rim of the cup. The electrode assembly is suspended by the shaft 22 supporting the ball 24.

A pressure element such as a cone frustum 28 mounted rotatably in a bracket 30 at a fixed angular location provides the necessary pressure on the bottom of the cup to bias the electrode 20 through a slight tilting movement into the position shown in FIGURE 1. Then the welding surfaces of the ridges 10 and 12 contact the workpiece 14 under pressure at the point 26. By means of a suitable device described hereinafter, the conical roller 28 can be moved upwards by the actuation of the handle 32 to release the pressure and to permit the electrode 20 to assume any position. For example the electrodes may be adjusted so that they are spaced apart and parallel with respect to each other for feeding the apparatus or for removing the finished workpiece.

From the foregoing it will be apparent that, under the pressure exerted by the conical roller 28, the lower electrode, when driven to rotate about its axis as indicated by the arrow 38 in FIGURE 1, entrains by frictional engagement at the location 26 the workpiece 14 which, in turn and for similar reasons, causes rotation of the upper cup-shaped electrode 20. It will be noted, however, that the upper electrode 20 rotates about the axis 40 which is slightly inclined with respect to the axis of the shafts 22 and 18. The point 26 at which frictional engagement between the workpiece 14 and the welding surface of the electrode ridge 12 occurs is thereby defined by the location at which the pressure cone 28 is mounted. It will be apparent that the cone 28 rotates about its axis so that frictional losses are reduced substantially, to that of the bearings by which the cone is supported in the bracket 30. When welding current is supplied to the electrodes through the shafts 18 and 22 or in any other suitable fashion, and when the shaft 18 is to rotate concurrently, the apparatus shown in FIGURE 1 produces a circular weld on the workpiece 14, the diameter of the weld being identical to that of the electrode ridges 10 and 12.

Figure 2:
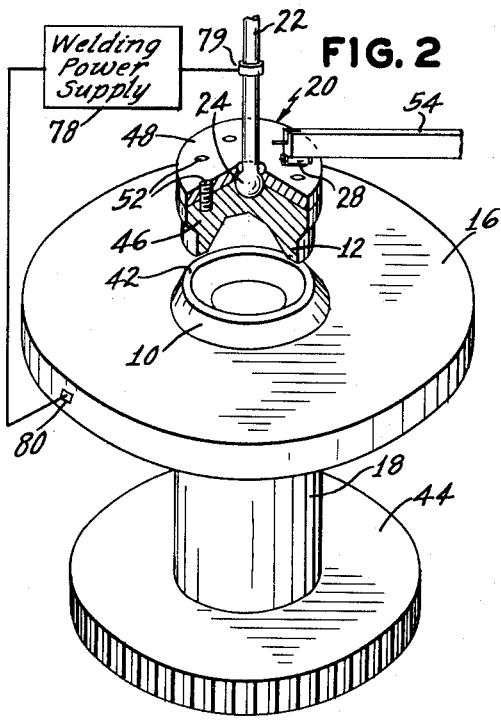
FIGURE 2 is a more detailed, partly fragmentary view of the apparatus of FIGURE 1 when at rest.

FIGURE 2 illustrates in a more detailed view the welding apparatus. The lower electrode assembly is mounted on the shaft 18. The body portion 16 of the electrode assembly has the shape of a circular plate and supports the ridge 10 with its welding surface 42. The shaft 18 is secured to a driving gear 44 to produce a rotary movement of this lower electrode about its axis. Suitable supporting bearings and driving mechanisms are well known and have therefore been omitted.

The upper electrode 20 is made of two portions to facilitate assembly with the ball-shaped end 24 of rod 22. The cup-shaped lower portion 46 of the upper electrode constitutes the actual electrode, the edge of its rim 12 forming the welding surface. Secured thereto is a circular plate 48 having a central cavity in the shape of a spherical segment communicating with a conical opening to provide free movement for the shaft 22. The spherical cavity in plate 48 cooperates with a similar cavity in the portion 46 to form a socket for the ball 24. Both portions 46 and 48 may be joined to each other by bolts 52 or by any other equivalent means. By virtue of the centrally located ball joint, the upper electrode 20 is enabled to rotate about its axis and simultaneously to pivot into a position in which its axis forms an angle with that of the shaft 22. Such a position is shown in FIGURE 1 and has been described above in connection therewith as the working position during operation of the apparatus.

In order to permit shifting the upper electrode 20 into its working position and to retain it in this position, a biasing element mentioned above in conjunction with FIGURE 1 is mounted to apply downward pressure on one edge of the cup-shaped electrode 20. The biasing element cooperates with a circular area of the upper surface of the plate 48. In accordance with one embodiment of this portion of the device, a supporting beam 54 is mounted radially and is fixed with respect to the remaining assembly as shown in FIGURE 2. The inner end of the beam terminates above the cup-shaped electrode 48 and carries the roller cone 28 and the shifting mechanism shown more detailed in FIGURE 3.

Figure 3:
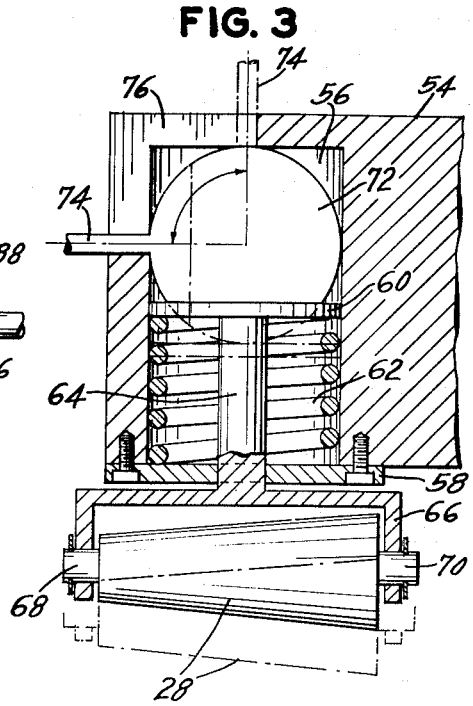
FIGURE 3 is a sectional view of the pressure roller forming part of the apparatus of FIGURE 2.

Now, referring to FIGURE 3, a cylindrical cavity 56 is provided in the end portion of the beam 54. The opening of the cavity facing the plate 48 of the electrode 20 is closed by means of a plate 58 having a central bore therethrough. Inside of the cylindrical cavity 56, a piston 60 is mounted to move axially against the action of a helical compression spring 62 provided in the cylinder between the piston 60 and the closure plate 58. Secured to the piston, a piston rod 64 extends axially through the spring 62 and through the cylinder to protrude therefrom through the bore in the plate 58. A bracket 66 is secured to the protruding end of the piston rod 64. Bracket 66 serves to support the cone frustum shaped roller 28 for rotation about its axis by means of a pair of axles 68 and 70. In FIGURE 3, the roller 28 is shown in its rest position by solid lines, while the dotted lines illustrate its working position. Switching from one position to the other is accomplished by means of a camming member 72 arranged in the cylindrical cavity 56 between the piston 60 and the upper end wall of the cavity. Consisting of the remainder of a sphere, having one segment cut-off to form a flat surface, the camming member can be actuated by means of a handle 74. The handle protrudes outside of the beam 54 through a slot 76 in the beam extending over the edge to permit operation of the handle 74 over a range of 90°. The handle is shown in FIGURE 3 by solid lines in its position in which the piston 60 lies flat against the flat side of the camming member 72, which corresponds to the raised position of the roller 28. When shifting the handle through 90° into its vertical position shown in FIGURE 3 by dotted lines, a spherical portion of the member 72 is brought to face the piston under compression of the spring 62, whereby the member 72 and the piston 60 assume the position designated in FIGURE 3 by dotted lines. As a result, the roller is maintained in its lowered position in which it cooperates with a circular area of the upper surface of the electrode 20. It is worthwhile noting that the angle between the axis of the cone 28 and the line of contact between cone 28 and electrode 20 is suitably identical with the angle between the planes of the two electrodes. When this relationship obtains, the cone 28 makes line contact with the electrode 20 throughout its length to ensure smooth cooperation. The electrode then contacts the workpiece 14 at the location 26 of FIGURE 1, under the pressure derived from the spring 62 for obtaining a weld at the location 26.

It will be apparent that, when current is applied to the electrodes by any suitable means over the shaft 22 and the plate 16, for example by connecting a welding power supply 78 to the shaft 22 at the location 79 and to the plate 16 at the location 80 of FIGURE 2, and when the gear 44 is driven to rotate the shaft 18 and therewith the electrode ridge 10, a circular weld is formed on the workpiece 14. By frictional action at the location 26 of FIGURE 1, the workpiece 14 and the cup-shaped electrode 20 are entrained into the rotary movement. Successive points around the periphery of the cup rim 12, pass the location 26 under the action of the roller 28 as the electrode 20 rotates about the axis 40. It will be noted that by virtue of this arrangement only a rolling movement occurs between the involved elements so that sliding or skidding thereof is excluded. As a result, a circular precision weld is obtained in one operation.

Evidently, in order to produce seams of distinct diameters, a set of correspondingly dimensioned electrodes is required for each diameter. While the upper, cup-shaped electrode can be removed by loosing the bolts 52 and assembling the electrode having the desired size with the ball joint 24, means for interchangeably mounting the lower electrode 16 are well known and need not be discussed herein. Since it is desirable that the roller 28 cooperate with a circular area of the bottom surface of the cup-shaped electrode 20 rather adjacent the periphery thereof, the beam 54 can be mounted by well known means to be moved and adjusted lengthwise in accordance with the selected electrode size.

Figure 4:
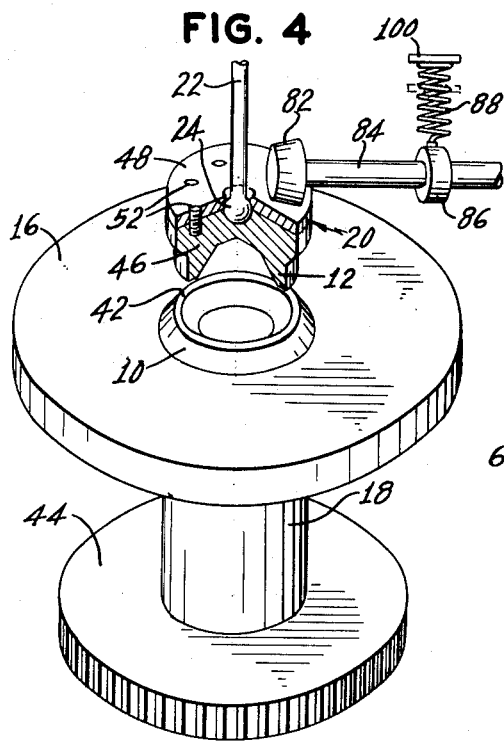
FIGURE 4 is a view of a welding apparatus using a modified pressure wheel.

The modification shown in FIGURE 4 is distinct from that described above only by an alternation of the pressure means. The electrodes and their mountings are unchanged. Instead of the cone frustum 28 of FIGURES 2 and 3, a pressure wheel 82, suitably slightly conically shaped, is mounted on a rotatably mounted shaft 84. Suspended by means of a roller bearing 86, the end of the shaft carrying the wheel 82 can be biased towards the electrode 20 or released to move away from the electrode. Thereby the shaft can be mounted to be displaced in its entire length into a working position parallel with the rest position. Alternatively, the outer end of the beam can be maintained in a bearing which permits rotation and pivoting thereof. In FIGURE 4, the pressure required may be obtained by a spring 88 secured between the housing of the bearing 86 and a movable support 100. FIGURE 4 illustrates the two positions of the spring support 100 in such a manner that the solid lines indicate the rest position whereas the dotted lines illustrate the working position in which the spring 88 biases the shaft 84 and therewith the wheel 82 into the operating positions of all the parts involved. This showing is similar to that of movable elements 66 and 28 of FIGURE 3, and the movement of support 100 may be implemented in the manner of FIGURE 3 or in accordance with other known arrangements. If so desired, the pressure wheel 82 may be mounted to rotate with respect to the beam 84, in which case the beam merely provides for the displacement of the wheel without rotating itself.

It will be noted that the pressure element, described as conical herein before, may be a ball mounted in a suitable casing to permit cooperation with the pivoting electrode. In any case, the casing or the bracket supporting the roller may be secured to the shaft 22 or in any other way to remain at a fixed location facing the upper surface of the electrode 20. In some instances it can be useful to provide means for driving the roller to travel along a circular path on the upper surface of the electrode 20. Devices to obtain this action can be easily designed, whereby the gear driving the lower electrode can be omitted, since no rotation of the electrodes is then required. As another possible modification, rotation of the electrodes can be accomplished by driving the upper, pivoting electrode through the shaft 22. With this arrangement, the ball joint must be replaced by a universal joint which is also capable of transmitting rotary movement. A further modification may involve driving through the roller which, in this case, assumes the shape of a gear engaging a mating gear provided on the electrode.

It will be obvious that many more modifications may be made within the scope of the present invention without departing from the spirit thereof, and the invention includes all such modifications.

What is claimed is:

1. In a welding apparatus, first and second electrodes, each electrode comprising an annular ridge having a circular welding surface, each welding surface having a diameter substantially identical with that of and facing the welding surface of the other electrode, both electrodes being rotatably mounted, the first electrode being additionally adapted to pivot in any direction for enabling any point of its welding surface to contact a facing point of the second electrode welding surface, means for rotating one of the electrodes, and substantially stationary means for biasing successively one after another each point of said first electrode welding surface toward a facing point on the second electrode welding surface when said point passes said biasing means upon a rotary movement of the first electrode.

2. In a welding apparatus, first and second electrodes, each electrode comprising an annular ridge having a circular welding surface, each welding surface having a diameter substantially identical with that of and facing the welding surface of the other electrode, the first electrode being pivotally and rotatably mounted for enabling any point of its welding surface to contact a facing point of the second electrode welding surface, means for rotating said second electrode about its axis and means for biasing successively one after another each point of said first electrode welding surface toward a facing point on the second electrode welding surface to cause pivoting and rotation of the first electrode by frictional engagement with the second electrode.

3. In a welding apparatus, first and second electrodes, each electrode comprising an annular ridge having a circular welding surface, each welding surface having a diameter substantially identical with that of and facing the welding surface of the other electrode, the first electrode being pivotally and rotatably mounted for enabling any point of its welding surface to contact a facing point of the second electrode welding surface, means for rotating said second electrode about its axis and rotatably mounted pressure means along which a circular area of the first electrode slides upon rotation of said first electrode for biasing successively one after another each point of said first electrode welding surface toward a facing point on the second electrode welding surface, to cause pivoting and rotation of the first electrode by frictional engagement with the second electrode.

4. In a welding apparatus, first and second electrodes, each electrode comprising an annular ridge having a circular welding surface, each welding surface having a diameter substantially identical with that of and facing the welding surface of the other electrode, the first electrode being supported by a centrally arranged ball joint to permit rotation and tilting thereof in any direction, means for rotating the second electrode about its axis, and means for applying a substantially axial pressure at one fixed location adjacent the first electrode for biasing one after another each point of the welding surface of said first electrode toward the facing point of the second electrode welding surface upon rotation of the first electrode caused by frictional engagement with the second electrode.

5. In a welding apparatus, a first, cup-shaped electrode having a rim, a second electrode comprising an annular ridge having a circular welding surface of which the diameter is substantially identical with that of the rim, the welding surface of the second electrode facing the rim of the first, a cup-shaped electrode; a universal joint centrally arranged in the bottom portion of said cup-shaped electrode to permit rotation and tilting of said electrode for contacting any point of the cup rim with a facing point of said welding surface; means for rotating the second electrode; and stationary means for biasing successively one after another each passing point of the cup rim of the first electrode toward a facing point on the welding surface of the second electrode upon rotation of the first, cup-shaped electrode by frictional engagement with the welding surface of the second electrode.

6. In a welding apparatus, a first, cup-shaped electrode having a rim; a second electrode comprising an annular ridge having a circular welding surface of which the diameter is substantially identical with that of the rim, the welding surface of the second electrode facing the rim of the first, cup-shaped electrode; means for mounting said cup-shaped electrode to permit rotation and tilting of said electrode in any direction for contacting any point of the cup rim with a facing point of said welding surface; a fixed rotatable pressure element mounted to roll along a peripheral area of the cup-shaped electrode passing said pressure element upon rotation of said electrode; means for applying a substantially axial pressure on said pressure element for biasing successively one after another each point of said cup rim toward a facing point of said welding surface upon rotation of the cup-shaped electrode caused by frictional engagement with the rotating second electrode; and means for rotating the second electrode.

7. In a welding apparatus, a first, cup-shaped electrode having a rim; a second electrode comprising an annular ridge having a circular welding surface of which the diameter is substantially identical with that of the rim, the welding surface of the second electrode facing the rim of the first, cup-shaped electrode; a ball joint centrally arranged in the bottom portion of said cup-shaped electrode to permit rotation and tilting of said electrode in any direction for contacting any point of the cup rim with a facing point of said welding surface; a conical pressure wheel rotatably mounted to contact a circular peripheral area of the bottom portion of said cup-shaped electrode, said area sliding along said rotating pressure wheel upon rotation of the cup-shaped electrode; and means for applying a substantially axial pressure on said pressure wheel for biasing successively one after another each passing point of the cup rim of the first electrode toward a facing point on the welding surface of the second electrode upon rotation of the first, cup-shaped electrode by frictional engagement with the welding surface of the second electrode; and means for rotating said second electrode.

8. In a welding apparatus, a first, cup-shaped electrode having a rim; a second electrode comprising an annular ridge having a circular welding surface of which the diameter is substantially identical with that of the rim, the welding surface of the second electrode facing the rim of the first, cup-shaped electrode; means for mounting said cup-shaped electrode to permit rotation and tilting of said electrode for contacting any point of the cup rim with a facing point of said welding surface; a shaft extending radially with respect to the electrode axis, the centrally located end of said shaft supporting a rotatable pressure element which contacts a circular, peripheral area of the bottom portion of the cup-shaped electrode, said area engaging said rotating pressure element upon rotation of said cup-shaped electrode; means for displacing the shaft end axially with respect to the electrodes for biasing successively one after another each passing point of the cup rim of the first electrode toward a facing point on the welding surface of the second electrode upon rotation of the first, cup-shaped electrode by frictional engagement with the welding surface of the second electrode; and means for rotating said second electrode.

9. A welding apparatus according to claim 8 in which the support for the pressure roll includes a cylinder mounted to face the circular, peripheral area of the bottom portion of the cup-shaped electrode, a piston provided in said cylinder to move against the action of a helical spring mounted in the cylinder between the piston and one cylinder end, a piston rod secured to the piston and protruding outside of said cylinder, the protruding end of the piston rod supporting the rotatably mounted pressure roll, a camming member mounted in the cylinder and means for actuating said camming member to shift the piston and therewith the pressure roll from one into the other position.

References Cited in the file of this patent

UNITED STATES PATENTS

| | | |
|---|---|---|
| 1,196,852 | Fulda | Sept. 5, 1916 |
| 2,474,129 | Tramontini | June 21, 1949 |
| 2,697,768 | Wolk | Dec. 21, 1954 |
| 2,826,673 | Matthes | Mar. 11, 1958 |
| 2,899,538 | Hughes et al. | Aug. 11, 1959 |